United States Patent
Ives et al.

(10) Patent No.: US 8,872,371 B2
(45) Date of Patent: Oct. 28, 2014

(54) ENHANCED METHOD OF CONTROLLING THE OUTPUT OF A HYDROELECTRIC TURBINE GENERATOR

(75) Inventors: James Ives, Dublin (IE); David Taaffe, Dublin (IE); Paul Dunne, Dublin (IE)

(73) Assignee: OpenHydro IP Liminted, Dublin (IE)

( * ) Notice: Subject to any disclaimer, the term of this patent is extended or adjusted under 35 U.S.C. 154(b) by 343 days.

(21) Appl. No.: 13/264,667

(22) PCT Filed: Dec. 17, 2009

(86) PCT No.: PCT/EP2009/009071
§ 371 (c)(1),
(2), (4) Date: Apr. 2, 2012

(87) PCT Pub. No.: WO2010/118766
PCT Pub. Date: Oct. 21, 2010

(65) Prior Publication Data
US 2012/0175877 A1 Jul. 12, 2012

(30) Foreign Application Priority Data
Apr. 17, 2009 (EP) .................... 09005504

(51) Int. Cl.
*F03B 13/10* (2006.01)
*F03B 13/12* (2006.01)
*H02P 9/04* (2006.01)
*F03B 15/00* (2006.01)
*F03B 13/26* (2006.01)

(52) U.S. Cl.
CPC ........... *F03B 15/00* (2013.01); *F05B 2270/101* (2013.01); *Y02E 10/28* (2013.01); *F05B 2260/85* (2013.01); *F03B 13/264* (2013.01); *F05B 2270/107* (2013.01); *F05B 2270/1033* (2013.01); *F05B 2270/404* (2013.01)
USPC ....................................... 290/42

(58) Field of Classification Search
CPC ........ F03B 13/264; F03B 15/00; F03B 13/26; F03B 13/20; F03B 13/1845; F03B 13/1815; F05B 2260/85; F05B 2270/101; F05B 2270/1033; F05B 2270/107; F05B 2270/404; Y02E 10/28; Y02E 10/38
USPC ......................................... 290/42, 43, 53, 54
See application file for complete search history.

(56) References Cited

U.S. PATENT DOCUMENTS 228,467 A 6/1880 Maclay
928,536 A 7/1909 Pino
(Continued)

FOREIGN PATENT DOCUMENTS

CA 2388513 8/2000
CA 2352673 1/2003
(Continued)

OTHER PUBLICATIONS

U.S. Appl. No. 13/133,832, filed Jun. 9, 2011, including the specification, claims and drawings.
(Continued)

*Primary Examiner* — Javaid Nasri
(74) *Attorney, Agent, or Firm* — Gardner, Linn, Burkhart & Flory, LLP (57) ABSTRACT

There is described a method for controlling the output of a tidal hydroelectric turbine generator from a remote location, with the need for control circuitry to be housed local to the generator. The rotational speed of the turbine, and consequently the output power level of the generator, is controlled by varying the transmission line voltage of the submarine power cable connecting the off-shore turbine with an on-shore substation.

8 Claims, 9 Drawing Sheets

(56) References Cited

U.S. PATENT DOCUMENTS

| | | | |
|---|---|---|---|
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,496,845 A | 1/1985 | Ensign et al. |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,495,221 A | 2/1996 | Post |
| 5,517,383 A | 5/1996 | Webb |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,894,416 B1 | 5/2005 | Leijon et al. |
| 6,957,947 B2 | 10/2005 | Williams |
| 6,995,479 B2 | 2/2006 | Tharp |
| 6,998,730 B2 | 2/2006 | Tharp |
| 7,190,087 B2 | 3/2007 | Williams |
| D543,495 S | 5/2007 | Williams |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 8,022,581 B2 | 9/2011 | Stiesdal |
| 8,308,422 B2 * | 11/2012 | Williams ................ 415/7 |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0155829 A1 | 8/2003 | McMullen et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021386 A1 | 2/2004 | Swett |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2004/0262926 A1 | 12/2004 | Hansen |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0164626 A1 | 7/2007 | Taniguchi et al. |
| 2007/0231072 A1 | 10/2007 | Jennings et al. |
| 2007/0241566 A1 | 10/2007 | Kuehnle |
| 2007/0262668 A1 | 11/2007 | Brisson et al. |
| 2007/0291426 A1 | 12/2007 | Kasunich et al. |
| 2008/0012538 A1 | 1/2008 | Stewart et al. |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0133838 A1 | 6/2010 | Borgen |
| 2010/0172698 A1 | 7/2010 | Ives et al. |
| 2010/0201129 A1 | 8/2010 | Holstein et al. |
| 2010/0232885 A1 | 9/2010 | Ives et al. |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |

(56) References Cited

FOREIGN PATENT DOCUMENTS

| | | |
|---|---|---|
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | 03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | 2009/016409 A2 | 2/2009 |
| WO | 2010118766 | 10/2010 |
| WO | WO2011039249 | 4/2011 |
| WO | WO2011039255 | 4/2011 |
| WO | WO2011039267 | 4/2011 |

OTHER PUBLICATIONS

International Search Report completed Mar. 30, 2010, mailed Apr. 8, 2010, from corresponding Application No. PCT/EP2009/009071.
PCT Written Opinion of International Searching Authority, Mar. 30, 2010, from corresponding Application No. PCT/EP2009/009071.
U.S. Appl. No. 13/133,235, filed Jun. 7, 2011, including the specification, claims and drawings.
U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.

* cited by examiner

ENHANCED METHOD OF CONTROLLING THE OUTPUT OF A HYDROELECTRIC TURBINE GENERATOR

FIELD OF THE INVENTION

The present invention relates to a method of controlling the output of a hydroelectric turbine generator, in particular controlling the output via the transmission system for that output, which additionally provides for the monitoring of fault conditions in the transmission system during periods of reduced generator output.

BACKGROUND OF THE INVENTION

The increased interest in environmental awareness, and a reluctance to rely on non-renewable sources of energy, has led to greater usage of renewable energy systems, e.g. solar power, wind power, thermal power, and tidal power. The latter involves the installation of turbine generators in an area of tidal flow, and converts the energy of the tides into electrical energy.

Figure 1:
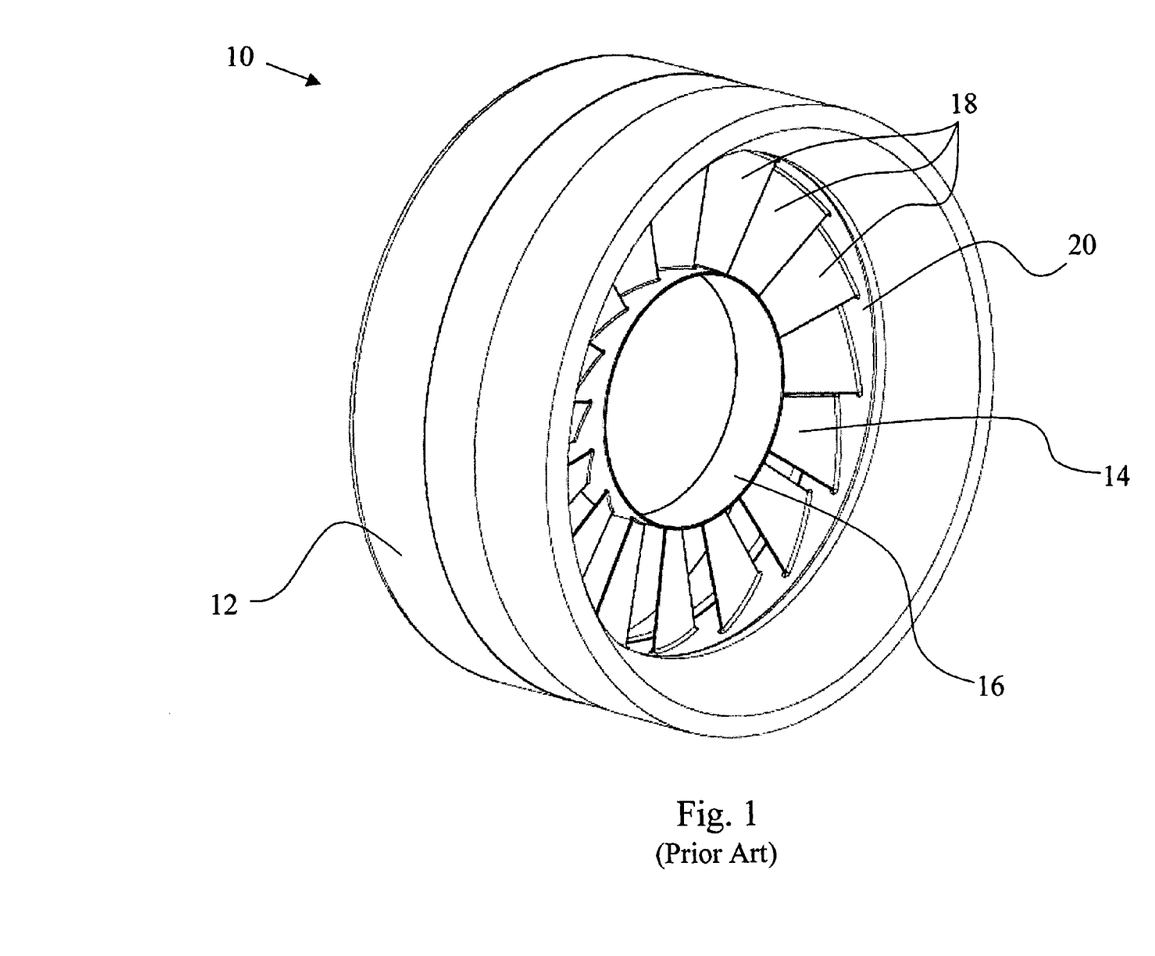
FIG. 1 shows a known tidal hydroelectric turbine generator.
Figure 2:
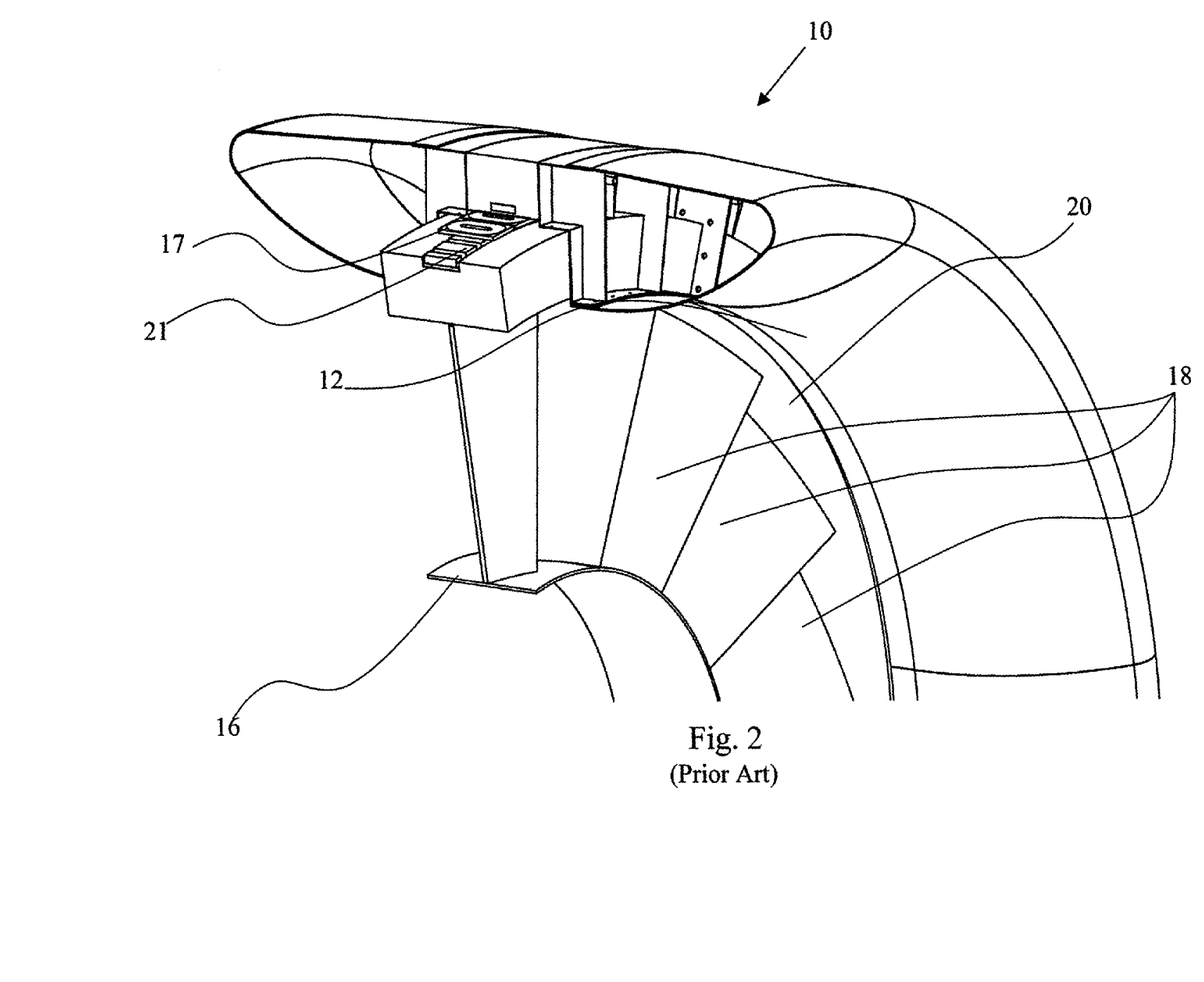
FIG. 2 shows a cross-section of a portion of the generator of FIG. 1.

With reference to FIGS. 1 and 2, an example hydroelectric turbine generator is described in PCT Application No. PCT/EP2007/006258. The generator 10 is of a direct-drive shaftless permanent magnet generator construction. The generator 10 comprises a ring-shaped stator 12 and a rotor 14, the stator 12 having a plurality of coils 17 (FIG. 2) located about the circumference of the stator 12. The rotor 14 comprises an inner rim 16, which defines an open centre. The rotor 14 further comprises an array of generally radially extending blades 18 captured between the inner rim 16 and an outer rim 20. The rotor 14 further comprises an array of magnets 21 (FIG. 2) disposed about the outer rim 20. The stator 12 concentrically surrounds the rotor 14, with the plurality of coils providing a magnetic flux return path for the magnets.

The generator 10 is positioned in an area of tidal flow, such that the motion of the seawater through the generator 10 acts on the blades 18, resulting in rotation of the rotor 14 within the stator 12. The motion of the magnets relative to the coils of the stator 12 causes the magnetic field generated by the magnets to induce an EMF in each of the coils. These induced EMFs provide the electrical power output from the turbine generator 10.

As there is increased utilisation of such tidal power generators, it becomes of greater importance to be able to accurately and effectively control the operation of the generators, in particular ensuring that the turbine generator is operating at its optimum "tip-speed ratio". The "tip-speed ratio" is the ratio between the rotational speed of the tip of a blade of the turbine and the actual velocity of the tidal flow, and is generally turbine-design dependent, with each turbine having an optimum tip-speed ratio for the optimum power generation by that turbine. Thus, the speed of operation of the turbine should be varied to ensure optimum output power for the level or tidal power available. Also, sometimes it can be necessary to "run back" the generated power output, dependent on the requirements of the main power grid.

In standard electrical generator systems, the amount of power extracted from generators can be controlled by varying the voltage or frequency of operation. This control is generally executed local to the generator. The electrical generator and associated controller are usually easily accessible for commissioning, servicing tests, maintenance and settings adjustments. In addition to a controller, renewable energy generators often locate power conversion and monitoring equipment in the vicinity of the generator, in order to immediately convert output power to a fixed voltage and frequency, and in order to monitor the condition of each individual generator.

The transmission systems that transport output power operate over long distances at a high voltage, using a voltage and frequency that is fixed to a certain value within a relatively small tolerance gap. Accordingly, the voltage output by a generator is normally stepped up to transmission levels close to the generators using a transformer.

Harnessing tidal energy presents significant challenges with respect to maintenance of the turbine in order to ensure continuing and efficient operation in the harsh submarine environment. The installation and decommissioning of submarine turbine generators is relatively expensive, and it is not economic to carry out regular maintenance on the various components in the system. Also, it is not feasible to include sensitive electronic equipment, power conversion and/or cooling systems local to the submarine generator (i.e. components that require regular servicing and routine maintenance in order to maintain long term reliability).

Therefore, it is an object of the invention to provide an alternative system and method for controlling the rotational speed of a hydroelectric turbine, and consequently the output of a hydroelectric turbine generator, which eliminates the need for controlling and monitoring components located local to the submarine generator.

SUMMARY OF THE INVENTION

Accordingly, there is provided a method for remotely-controlling the output power generated by at least one off-shore tidal hydroelectric turbine generator from a remote substation using at least one submarine power cable transmitting power from said at least one turbine generator to said substation, the method comprising the step of varying the line voltage of the submarine power cable to control the rotational speed of the turbine generator, the rotational speed of the turbine generator being related to the output power generated by the turbine generator.

The turbine rotational speed of a turbine generator is controlled by the transmission line voltage present at the turbine generator, as well as the tidal velocity, with the rotational speed related to the level of output power generated. As the line voltage of the generator is varied, the turbine speed can be directly controlled up to that level at which the tide is free spinning the turbine, with the result that the level of output power produced by the generator can be adjusted as required. The use of the power transmission system to control the output of the turbine generator allows for suitable control over the generator output to be located away from the generator site, which allows for more efficient monitoring and maintenance of the system. As the line voltage of the submarine power cable can be varied from a remote power substation, this allows for the remote-control of the rotational speed, and consequently the level of power generated, by the off-shore turbine generator. This eliminates the need for control circuitry at the sub-sea generator site. It will be understood that the remote power substation may be an on-shore substation.

Preferably, the varying of the line voltage is in proportion to the tidal power available at the turbine generator, such that the line voltage of the submarine power cable provides for the optimum tip-speed ratio of the turbine generator for the tidal power available.

The quantity of output power that can be generated by a turbine generator is determined by the tidal power available at that generator. As more tidal power is available, the generator may generate a higher quantity of output power. Accordingly, the optimum turbine operation for a period of higher tidal flow is at higher speed to maintain the optimum tip-speed ratio. Similarly, if there is a reduction in the tidal power available, the optimum turbine operation is at a lower tip-speed to maintain the optimum tip-speed ratio. As the rotational speed of the turbine is related to the transmission line voltage the turbine is allowed to operate at, then the line voltage can be varied to ensure that the turbine generator is always operating at its optimum level.

Preferably, the method comprises the steps of:
(i) monitoring a signal representative of the tidal power available at the at least one off-shore tidal hydroelectric turbine generator and received at said remote substation through said submarine power cable;
(ii) adjusting the line voltage on said submarine power cable from said remote substation, wherein the line voltage is reduced when the tidal power available decreases and the line voltage is increased when the tidal power available increases; and
(iii) repeating steps (i)-(iii) such that the line voltage level of the submarine power cable is varied in proportion to the tidal power available.

Preferably, step (i) is performed for a given line voltage value of said submarine power cable, and wherein said signal representative of the tidal power available is the output power level at said given line voltage value, and wherein step (ii) further includes updating the given line voltage value to the adjusted line voltage value.

As the output power generated by a tidal turbine generator at a particular line voltage is directly proportional to the tidal power available at that time, then the level of output power generated is indicative of the current strength of tidal power available. Using the level of output power generated to indicate the current tidal flow strength means that additional tidal flow monitoring components and communications networks are not required, as it is possible to determine changes in the tidal flow strength by monitoring changes in the level of output power generated.

Preferably, the method comprises the steps of:
(i) receiving a signal of a constraint condition that the output power generated by said at least one off-shore tidal hydroelectric turbine generator is to be constrained, including an indication of a set level of output power that it is desired to be generated by said at least one off-shore tidal hydroelectric turbine generator;
(ii) monitoring the output power generated by said at least one off-shore tidal hydroelectric turbine generator and received at said remote substation through said submarine power cable;
(iii) comparing the monitored output power level with said set output power level;
(iv) adjusting the line voltage on said submarine power cable from said remote substation, the adjustment based on said comparison, such that the output power generated by said at least one turbine generator closely follows the set output power level; and
(v) repeating steps (ii)-(iv) such that the monitored output power closely follows the set output power level until the constraint condition is removed.

Sometimes it is desirable to be able to "run back" the output of a generator, e.g. if, due to a transmission constraint, the transmission system operator may send a request that generation is temporarily reduced until the constraint is removed. In this case, it is possible to vary the line voltage of the submarine power cable until the set level of output power is reached.

After the constraint is removed it is possible to again vary the line voltage to bring the output power back to the optimum level.

Preferably, in a further embodiment, the method provides for remotely-controlling the output power of an array of off-shore tidal hydroelectric turbine generators from an on-shore substation using a submarine power cable transmitting power from said array to said on-shore substation, the method comprising the step of varying the line voltage of the submarine power cable to control the rotational speed of the turbine generators in the array, the rotational speed of the turbine generators in the array being related to the output power of the array of turbine generators.

In this way, the output of an entire array of turbine generators can be monitored, and the line voltage varied to control the total output of the array, using only a single submarine power transmission cable.

Preferably, the varying of the line voltage is in proportion to the tidal power available at the array, such that the line voltage of the submarine power cable provides for the tip-speed of each turbine generator in the array that allows for the maximum power generation by the entire array for the tidal power available.

This ensures that the line voltage of the array can be varied to ensure the generation of the maximum amount of power that can be extracted from the array, for the prevailing tidal conditions. While this may mean that not all or perhaps none of the turbine generators are operating at their specific optimum point, it ensures that the overall output of the array is maximised when using a single power cable to control the array. It will also be understood that the variation of the line voltage can be said to follow a half-wave sinusoidal signal, varying as it does in parallel with the ebb and flow of the level of tidal power.

Alternatively, the method provides for remotely-controlling the output power of an array of off-shore tidal hydroelectric turbine generators from a remote substation, wherein each turbine generator in the array has a respective submarine power cable transmitting power from said turbine generator to said remote substation, the method comprising the step of varying the line voltage of each of the submarine power cables to control the rotational speed of each individual turbine generator in the array, the rotational speed of the turbine generator being related to the output power of the turbine generator.

It will be understood that an array of turbine generators may comprise at least one turbine generator.

Preferably, the varying of the line voltage is in proportion to the tidal power available at the turbine generator, such that the line voltage of each of the submarine power cables provides for the optimum tip-speed ratio of each of the turbine generators in the array for the tidal power available at the array.

Preferably, the step of varying the line voltage of the submarine power cable to control the rotational speed of the turbine generator is based on the predicted tidal power available at the turbine generator.

If the variation of the line voltage is based on the predicted level of tidal power available, this allows for simple automatic control of the generator operation, based on known information regarding predicted tides, etc. Preferably, the amount of power produced at a given line voltage set point is checked against the amount of power expected for that set point at that moment in time. Given the predictable nature of tidal energy, by tracking the date and time an estimate of the amount of power expected can be taken from a database, and compared to provide a method of monitoring if the control system and the array of turbine generators are performing correctly.

Furthermore, there is provided a method for remotely-controlling the output power generated by at least one off-shore tidal hydroelectric turbine generator from a remote substation using at least one submarine power cable transmitting power from said at least one turbine generator to said substation, the method comprising the step of varying the line voltage of the submarine power cable to control the rotational speed of the at least one turbine generator, the rotational speed of the turbine generator being related to the output power generated by the at least one turbine generator, characterised in that the method comprises the step of maintaining a minimum line voltage level on the submarine power cable when the output power generated by the at least one turbine generator drops below a defined output power level.

As a minimum voltage level is maintained on the submarine power cable, this allows for the monitoring of fault conditions in the cable during periods of slack tide. Also, the electrical stress acting on the power cable is reduced, due to the reduced range of variation of the voltage on the power cable, leading to an increased cable lifetime.

Preferably, the varying of the line voltage is in proportion to the tidal power available at the turbine generator, and further characterised in that the method further comprises the step of maintaining a minimum line voltage level on the submarine power cable when the tidal power available at the turbine generator drops below the cut-in speed of the turbine generator.

Preferably, the line voltage is varied between a first value corresponding to a first value below which no output power is generated by the at least one turbine generator, and a second value at which level maximum power is generated by the at least one turbine generator.

Preferably, the minimum line voltage level is between 25%-35% of the peak voltage of the turbine generator.

Alternatively, the minimum line voltage level can be much higher during open-circuit or "runback" operation. Furthermore, there may be occasions when the minimum level could be as high as 50-60% of the peak voltage. Also, it will be understood that the line voltage level may be maintained at a minimum level before the power generated by the turbine generator reaches zero (i.e. before the tidal power available reaches the cut-in speed of the turbine generator).

Preferably, the method comprises the steps of:
(i) monitoring a signal representative of the tidal power available at the at least one off-shore tidal hydroelectric turbine generator and received at said remote substation through said submarine power cable;
(ii) adjusting the line voltage on said submarine power cable from said remote substation, wherein the line voltage is reduced when the tidal power available decreases and the line voltage is increased when the tidal power available increases; and
(iii) repeating steps (i)-(iii) such that the line voltage level of the submarine power cable is varied in proportion to the tidal power available, characterised in that the method further comprises the steps of:
(iv) maintaining a minimum line voltage level on the submarine power cable whenever the tidal power available at the at least one off-shore tidal hydroelectric turbine generator drops below the cut-in speed of the hydroelectric turbine generator.

Preferably, the method further comprises the step of: while maintaining the minimum line voltage level on the submarine power cable, monitoring the state of a circuit formed by the submarine power cable to determine the presence of faults in the cable.

Preferably, the method provides for remotely-controlling the output power of an array of off-shore tidal hydroelectric turbine generators from a remote substation using a submarine power cable transmitting power from said array to said remote substation, the method comprising the step of varying the line voltage of the submarine power cable to control the rotational speed of the turbine generators in the array, the rotational speed of the turbine generators in the array being related to the output power of the array of turbine generators, characterised in that the method comprises the step of maintaining a minimum line voltage level on the submarine power cable when the output power generated by the at least one turbine generator drops below a defined output power level.

DETAILED DESCRIPTION OF THE INVENTION

An embodiment of the invention will now be described, by way of example only, with reference to the accompanying drawings, in which.

With reference to FIG. 2, an off-shore tidal hydroelectric turbine generator 10 is installed in an area of tidal flow. The generator 10 is connected to an on-shore power substation 22 via a submarine power cable 24. The substation 22 provides an interface between the hydroelectric generator network and the electrical distribution grid 26. The power cable 24 transfers the power generated by the generator 10 over the distance from the off-shore turbine 10 to the on-shore substation 22. In general, the AC power generated by the turbine 10 is rectified to DC prior to transmission over the power cable 24.

It will be understood that while the system in FIG. 2 shows a single hydroelectric turbine generator 10, the submarine power cable 24 may connect to other turbine generators as part of an array of tidal turbine generators 10. An array of turbine generators 10 may comprise a number of generators connected in parallel, contributing power onto the same power cable. Alternatively, an array of turbine generators 10 may comprise a number of generators located in the same tidal area, contributing power to a series of power cables.

The cumulative power generated by the generators in the array may be then transferred back to the on-shore substation 22 via a single power cable 24. Alternatively, each turbine generator 10 in an array may be connected to the on-shore substation 22 by a respective submarine power cable 24 associated with that generator 10.

The on-shore substation 22 comprises the appropriate power conversion and power transformation apparatus. The power conversion apparatus may comprise a controller operable to vary the DC line voltage on the submarine power cable 24. In the preferable operation of the system, the variation of the DC voltage on the cable 24 is performed in proportion to the amount of tidal power available at the generator 10. For optimum operation, the output power of the generator 10 is transferred along the cable 24 at a higher voltage during strong tidal conditions, and at lower voltage during weak tidal conditions. It will be understood that the voltage induced is of a high enough level that it is suitable for transmitting power over long distances, e.g. from a remote off-shore tidal generator array to an on-shore sub-station and supply grid.

Above a certain tidal flow level, the rotational speed of the turbine is proportional to the voltage the turbine generator 10 is allowed to operate at. In order to continually draw maximum power from the tidal flow, it is necessary to operate the turbine at a fixed tip-speed ratio. The tip-speed ratio is the ratio between the rotational speed of the tip of a blade and the actual velocity of the tidal flow. If the velocity of the tip is exactly the same as the tidal speed, the tip speed ratio is 1. The optimum tip speed ration for a particular turbine generator is determined by the design of the blades 18 for that particular turbine.

Therefore, it is desired to vary the speed of rotation in proportion to the speed of the flow, to ensure optimal operation of the turbine generator 10. As the speed of rotation is controlled, then the output power of the generator 10 can be maintained at the optimum level for the tidal power available at the generator 10.

The control of the speed of rotation is achieved by the controller by controlling the level of the DC line voltage on the submarine power cable 24 in proportion to the speed of the tide, to allow a single turbine to operate at a fixed tip-speed ratio, or an array of turbines to operate as close as possible to the optimum tip-speed ratio for the array.

In an area of relatively constant tidal velocity, the optimum rotational speed of a turbine is dependent on the torque speed curve for the turbine.

Figure 4:
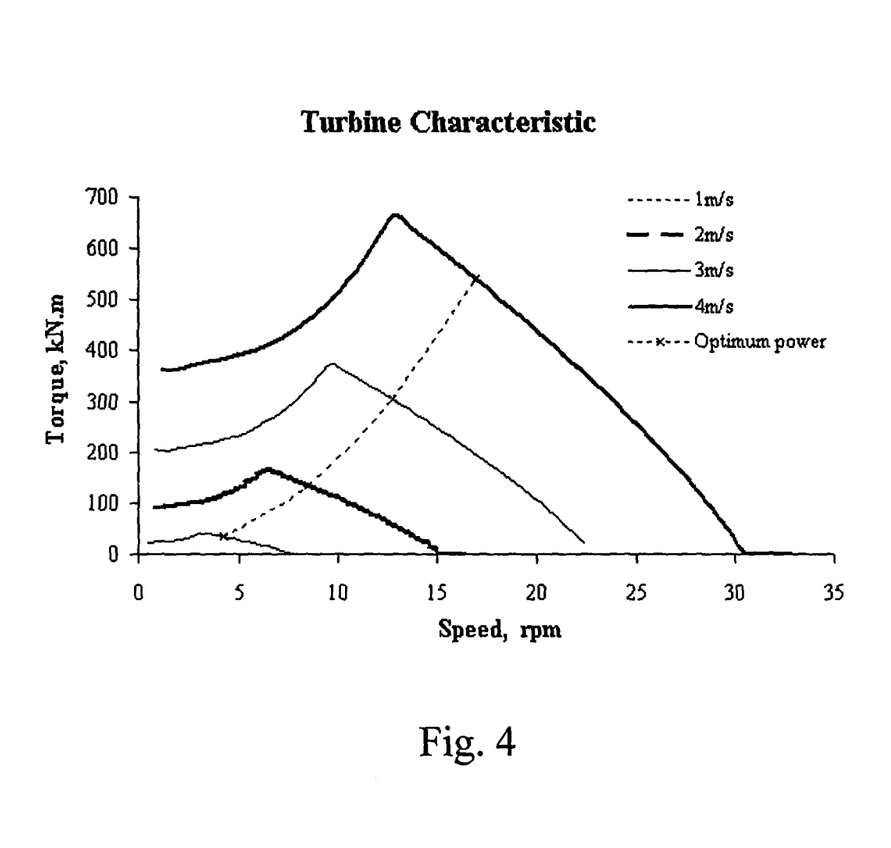
FIG. 4 is a graph of several torque speed curves for a sample turbine generator in different levels of tidal flow.
Figure 5:
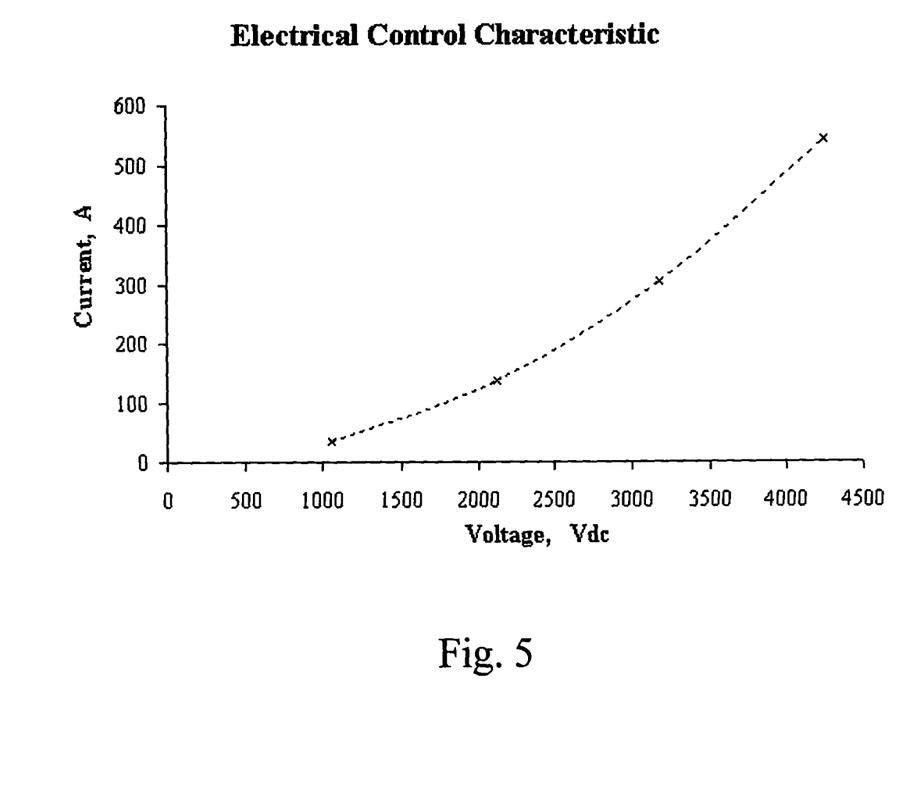
FIG. 5 is a graph of the voltage and current for a sample turbine generator.

With reference to FIG. 4, the torque speed curve is shown for a particular turbine for four different levels of tidal velocity, showing the variation in torque produced as the rotational speed of the turbine is varied, as well as the optimum points of the various torque speed curves. The curve showing the optimum points represents voltage and current, and is shown in more detail in FIG. 5. As can be seen from the graphs, the optimum power output when in a tidal flow of 4 m/s occurs at a tip-speed of approximately 17 RPM, resulting in an output torque of approximately 520 kNm. In order to operate the turbine at 17 RPM it is necessary to operate the cable at 4,200V, as can be seen from the V-I graph. Any increase or decrease in turbine tip-speed from this point will result in a corresponding reduction in output power.

While the manual control of the transmission line voltage by an operator is possible, it is also foreseen that the control operation may be automatically regulated, for example via a control algorithm implemented in a Programmable Logic Controller (PLC) or other suitable processing means located at an on-shore power substation 22. The PLC or processing means is operable to vary the transmission line voltage of the submarine power cable 24.

Figure 6:
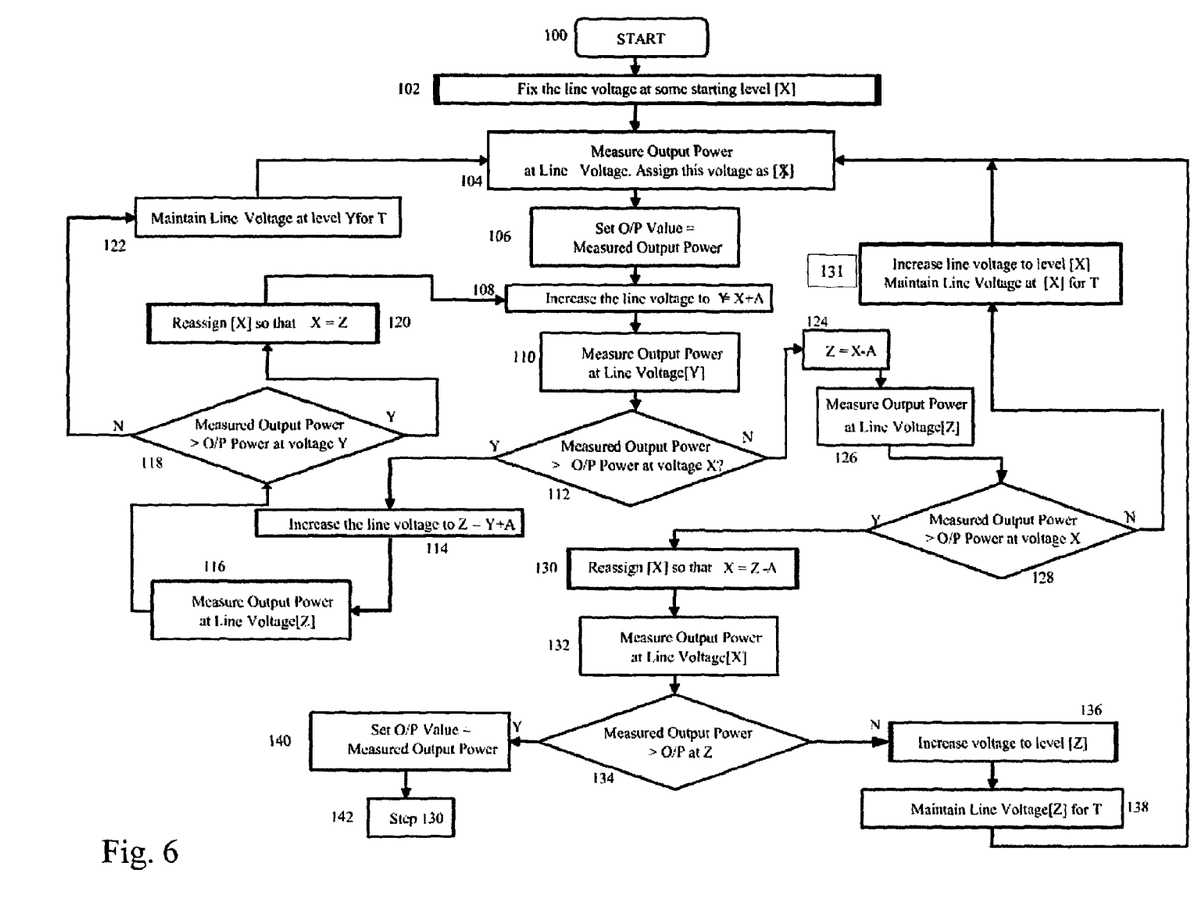
FIG. 6 is an illustration of a sample control algorithm for the method of the invention.

With reference to FIG. 6, a sample control algorithm is illustrated. The algorithm is operable to vary the transmission line voltage across a range of DC voltage values, in order to ensure optimum power generation.

At initiation of the algorithm, 100, the line voltage is set at some starting voltage X, step 102. The controller then measures, step 104, the output power generated by the turbine generator 10 for the set line voltage value X on the submarine power cable 24. The measuring action may be performed by averaging the DC output power level generated over a period of time.

The measured power level for that particular line voltage level X is then recorded, step 106. The transmission line voltage on the power cable is then increased by a step voltage A, creating a new voltage level Y=X+A, step 108. The output power generated for that particular line voltage value Y is measured, step 110.

A comparison operation is then performed, step 112, comparing the level of output power measured at line voltage Y, and the level of output power recorded at line voltage X.

If the currently measured level of output power is greater than the recorded power level for line voltage X, then this indicates that the line voltage Y value results in improved output power generation, as a result of a tip-speed ratio closer to the optimum tip-speed ration for that generator (in part determined by the tidal power available at the turbine generator 10).

Dependent on the current position on the turbine characteristic curve (see FIG. 4), a further increase to the transmission line voltage may result in increased power output. At this point, the line voltage is increased by a further step voltage A, resulting in new transmission line voltage level Z=Y+A, step 114.

The measured power level for that particular line voltage level Z is then recorded, step 116. A comparison operation is then performed, step 118, comparing the level of output power measured at line voltage Z, and the level of output power recorded at line voltage Y.

If the measured output power at Z is greater than the recorded output power for Y, then it is possible that the optimum point on the turbine characteristic curve has not yet been reached. The algorithm can then be looped back, assigning X so that X=Z, step 120, and returning to step 108 of the algorithm for further testing of the output power level.

If, however, the output power at Z is less than the output power at Y, then it is likely that the transmission line voltage value of Y provides for the optimum power generation, and the line voltage value Y is maintained on the power cable 24 for a period of time T, step 122, after which the algorithm returns to step 104.

Time period T is chosen to provide a balance between how quickly it is predicted that the tidal power level can vary dramatically, and how often it is desired to vary the transmission line voltage on the submarine power cable 24, e.g. 5 minutes.

If in step 112 the level of output power measured for line voltage Y is less than the level of output power measured for line voltage X, then this indicates that increasing the line voltage on the submarine power cable 24 results in a drop in the output power generated. The algorithm then aims to check if a reduction in the transmission line voltage would result in improved output power generation. This is again dependent on the current position on the turbine characteristic curve.

First, step 124, the line voltage is reduced to a level Z=X−A. Then, step 126, the controller measures the output power generated for line voltage Z. A comparison is then made of the level of output power measured for line voltage X and the level of output power measured for line voltage Z, step 128.

If the level of output power measured for line voltage Z is less than the level of output power measured for line voltage X, then the optimum output power appears to be generated at a line voltage level of X. Accordingly, the line voltage value X is maintained on the power cable 24 for a period of time T, step 131, after which the algorithm returns to step 104.

Figure 3:
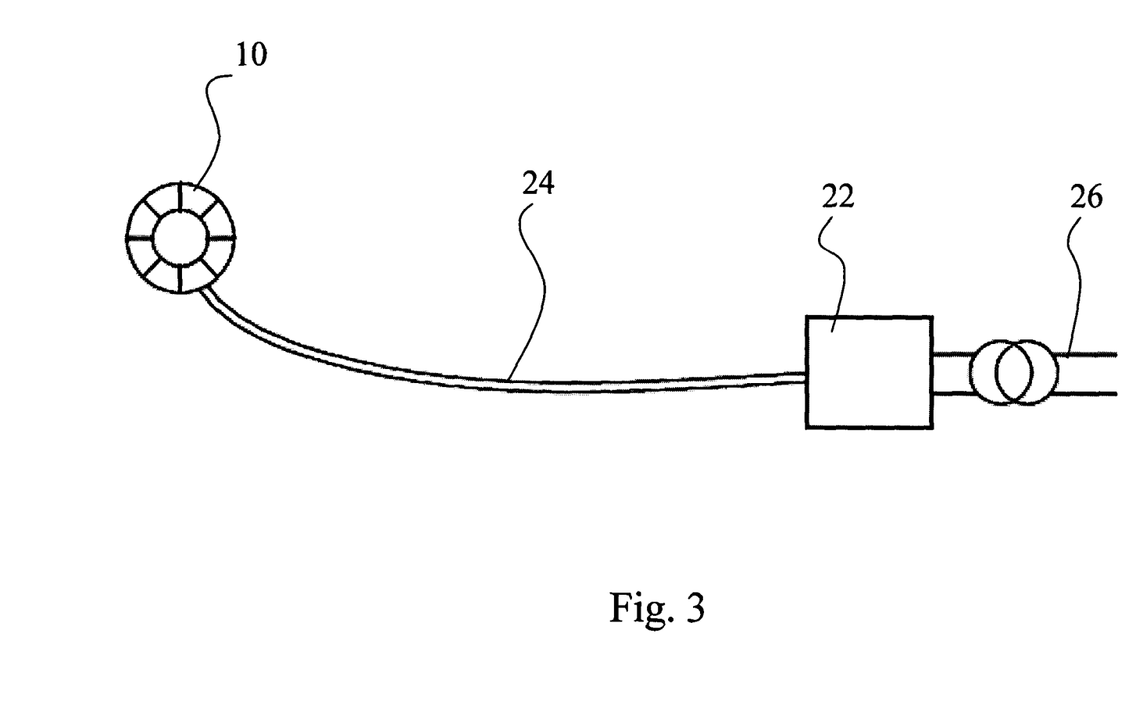
FIG. 3 shows the generator of FIG. 1 connected to an on-shore substation.

If the level of output power measured for line voltage Z is greater than the level of output power measured for line voltage X, then it is possible that a further reduction in the transmission line voltage level will result in a corresponding increase in the output power generated (see FIG. 3).

First, the transmission line voltage is reduced to a new level, assigned X=Z−A, step 130. The output power generated for this level is then measured for this line voltage level X, step 132. In step 134, a comparison is made between the level of output power measured at line voltage X, and the level of output power recorded at line voltage Z.

If the level of output power measured for line voltage Z is greater than the level of output power measured for line voltage X, then line voltage Z results in the optimum power generation for the current level of tidal power available. Accordingly, the transmission line voltage is increased back to level Z, step 136, and the line voltage value Z is maintained on the power cable 24 for a period of time T, step 138, after which the algorithm returns to step 104 for further monitoring.

However, if the output power continues to increase for further reduced line voltage values, then the algorithm continues to reduce the transmission line voltage level until the optimum power generation has been reached, steps 140,142.

The use of such a described algorithm will result in a continued variation of the level of the transmission line voltage to ensure that the optimum power generation is continually maintained.

Figure 7:
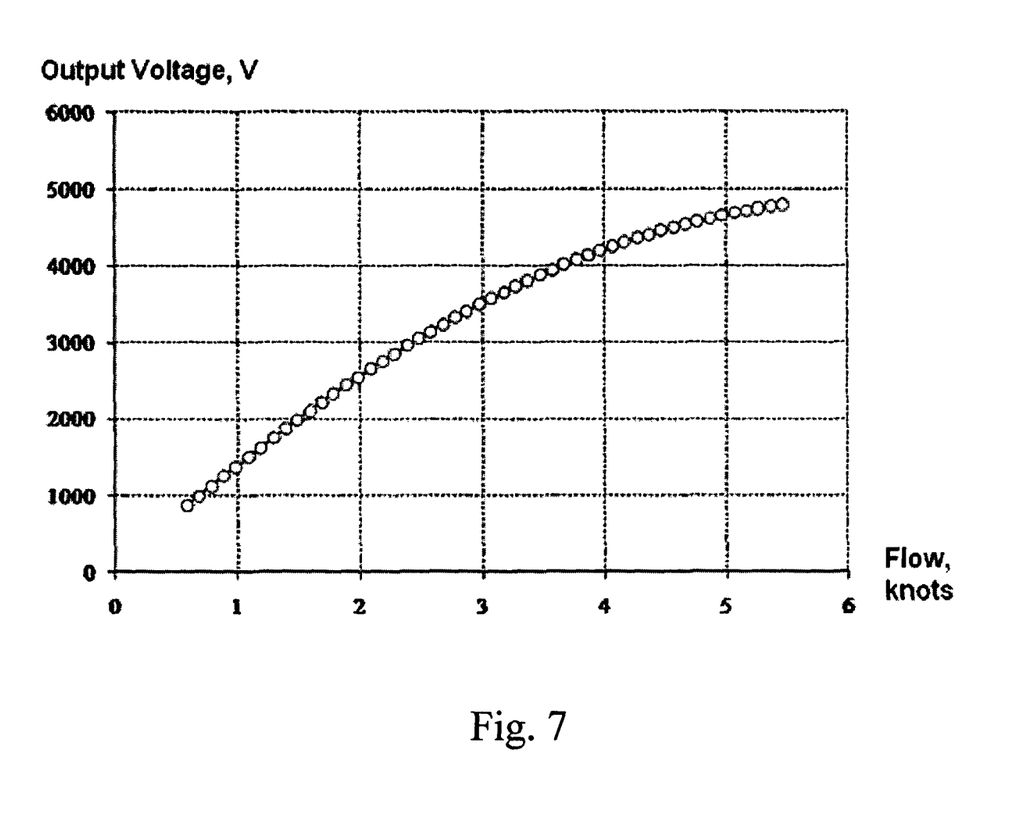
FIG. 7 is a graph showing a sample variation of the transmission line voltage of a submarine power cable with respect to the speed of the tide.

With reference to FIG. 7, a graph is shown for a sample tidal hydroelectric turbine generator system, illustrating the optimum line voltage levels for a range of values of tidal flow. As can be seen from the graph, the optimum voltage increases as the tidal flow speed increases, and this is as a result of the need to operate the turbine at a higher RPM in order to maintain the same optimum tip-speed ratio.

Figure 8:
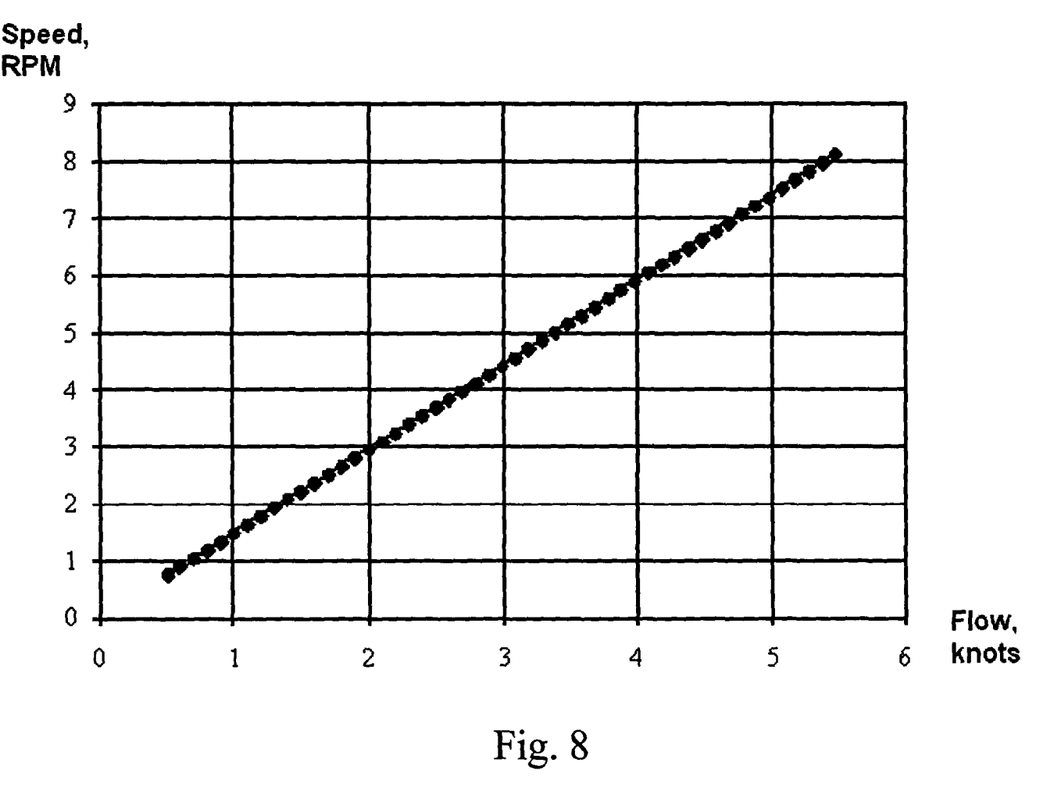
FIG. 8 is a graph showing the optimum tip-speed for a turbine generator with respect to the speed of tidal flow at that turbine generator.

With reference to FIG. 8, a graph is shown illustrating an optimum turbine RPM level for a sample turbine in relation to the speed of tidal flow at that turbine. This relationship should be followed in order to maintain the optimum tip-speed ratio. The linear relationship between the tidal power and rotational speed can be easily seen from this graph. However, in a fixed tide of, say 3 knots, any change in turbine rotational speed above or below approximately 4.5 RPM will lead to less than optimum power output (see FIG. 4 above).

While the illustrated sample algorithm is geared towards finding the transmission line voltage for the optimum power generation, it will be understood that different variations of this algorithm may be implemented without departing from the scope of the invention. For example, the same control system can also be used to reduce generation output when required—e.g. due to a transmission constraint, the transmission system operator (e.g. a national grid operator) may request that the output power is temporarily run back, or reduced, until the transmission constraint is dealt with. On receipt of this request, the onshore control system will modify the line voltage accordingly and move the farm of turbines away from their optimum tip speed ration until the desired level of output power is reached. When the constraint from the operator is removed the farm can return to normal operation.

Also, it will be understood that the algorithm may be interrupted by an operator at any time to allow for manual control of the transmission line voltage level.

It will also be understood that the algorithm may be adapted to receive additional input signals, e.g. the output from a tidal speed sensor upstream of the turbine generator, to ensure that the line voltage is adjusted such that the turbine generators always operate at their optimum tip-speed ratio.

Furthermore, in an alternative embodiment, variation of the line voltage of the submarine power cable may be based on the estimated tidal power available at the turbine generator. In locations where the level of tidal power can be relatively easily predicted, e.g. through tidal charts, it may be possible to base the variation of the line voltage on the predicted tidal power level, to ensure optimum operation. Given enough knowledge of the tidal flow at the turbine generator site, the line voltage can be simply varied every six hours to set the appropriate RPM of the turbine, with minimum RPM/voltage allowed at slack tide and maximum voltage/rpm on a given day dictated by the expected peak tidal velocity on that day, with the maximum voltage for the year occurring during spring tides.

It will also be understood that the remote control of the rotational speed of the turbine generator may be used to stop rotation of the turbine itself, e.g. by varying the line voltage to such an extent that the turbine purposively stalls. It should be noted that for a specific tidal speed, increasing line voltage may actually reduce the amount of power available, see FIG. 4. Reducing line increases the risk of stalling the turbine, as there can be relatively large changes in power output as the turbine slows down. Increasing turbine speed above the optimum tip-speed can result in a more gradual reduction in power output, and this may be a more preferable way to implement such a control.

In a further enhancement, the method may be adapted to deal with the problems associated with cable damage detection at slack tide levels, as well as reducing the stresses applied to a submarine cable with a view to increasing the lifetime of the components used.

In an area of tidal flow, the level of tidal power available varies over the course of the tidal cycle, i.e. when the water level is increasing (rising tide, called the flood tide), and when the water level is decreasing (lowering tide, called the ebb tide).

During the flood tide, the tidal currents will gradually increase until the peak flood tide level is reached. The power level of the tidal current then gradually decreases until the sea reaches its highest level, at high tide. At this point, the tidal current reaches its lowest point, and is called the slack tide. Once slack tide is reached, the direction of tidal flow reverses, and enters the ebb tide.

Similar to the flood tide, during the ebb tide the tidal currents will gradually increase until the peak ebb tide level is reached. The power level of the tidal current then gradually decreases until the sea reaches its lowest level, at low tide. Once at low tide, the tidal current again is slack, and the direction of tidal flow reverses, and becomes a flood tide.

The above cycle continues to repeat itself, occurring twice every day for a semidiurnal tide (two high waters and two low waters each day), or once a day for a diurnal tide (one tidal cycle per day).

Strictly applying the above-described control method involves varying the line voltage of the submarine power cable from 0V to peak voltage over the tidal cycle in correlation with the level of tidal power available, i.e. every 6 hours for a semidiurnal tide, or every 12 hours for a diurnal tide.

There are some disadvantages with this approach. In general, submarine power cables are vulnerable to faults such as breakages caused by, e.g., fishing gear, environmental conditions, etc. If a cable fault occurs during that period of slack tide when the line voltage of the cable is at 0V, such a fault might not be easily detected. In such a case, as the tidal power level begins to rise as part of the tidal cycle, and as power generation recommences, an undetected fault in the submarine power cable would result in further damage to the cable. This damage would initially occur in the region of the fault, but could result in a catastrophic failure of the cable if the power generation were allowed to continue. If such a situation occurs, the entire cable may require replacement, resulting in considerable expense and time devoted to repair and replacement.

Also, the constant variation in electrical stress on the cable insulation reduces its lifetime, as the cable insulation will gradually suffer a loss of polarisation.

In the enhanced control method, the line voltage of the submarine power cable is varied in accordance with the level of tidal power available at the offshore generator, with the further condition that a fixed voltage is applied in the power cable once the tidal power available drops below a threshold level. The fixed voltage is maintained on the cable until the tidal power available rises above the threshold.

The threshold may be chosen as any value of tidal power, but preferably is that level of tidal power (or tidal current velocity) below which the turbine generator is unable to be extract power. This level is called the cut-in speed of the turbine.

As below the cut-in speed of the turbine no power can be generated by the turbine, there is no loss in the total level of energy that may be generated by the turbine. However, maintaining a fixed voltage on the submarine power cable allows for any cable faults to be detected quickly, as the fault would be immediately apparent. Once detected, the faulty cable may be easily isolated from the generation grid before any additional damage is done to the cable, i.e. before generation is allowed to continue. Utilising this method means that, in the event of fault or breakage, only a small section of cable in the vicinity of the fault may need to be repaired, as opposed to the possibility of replacing the entire cable.

Further advantages of this method include an increased cable lifetime, due to the reduced electrical stresses applied to the cable. Also, the power conversion equipment and other electrical components used in the generating system may be designed to have a reduced range of operation. Furthermore, the early identification of a fault during slack tide (i.e. before the peak generation output) gives enough notice to the transmission system operator that there will be an outage on the tidal farm, such that alternative generation systems can be employed to cover the shortfall.

To detect the presence of a cable fault, the system earth point is located onshore and connected through a high impedance. The voltage across this impedance can be measured, and in healthy conditions (i.e. non-fault conditions) is expected to be zero. However, it will be understood that are various different methods that can be used for detecting faults on cables and lines (e.g. differential protection, overcurrent/earth fault undervoltage, neutral voltage displacement etc.). All of these methods of protection require that the circuit is in a live state in order to detect the change in state caused by the fault.

Figure 9:
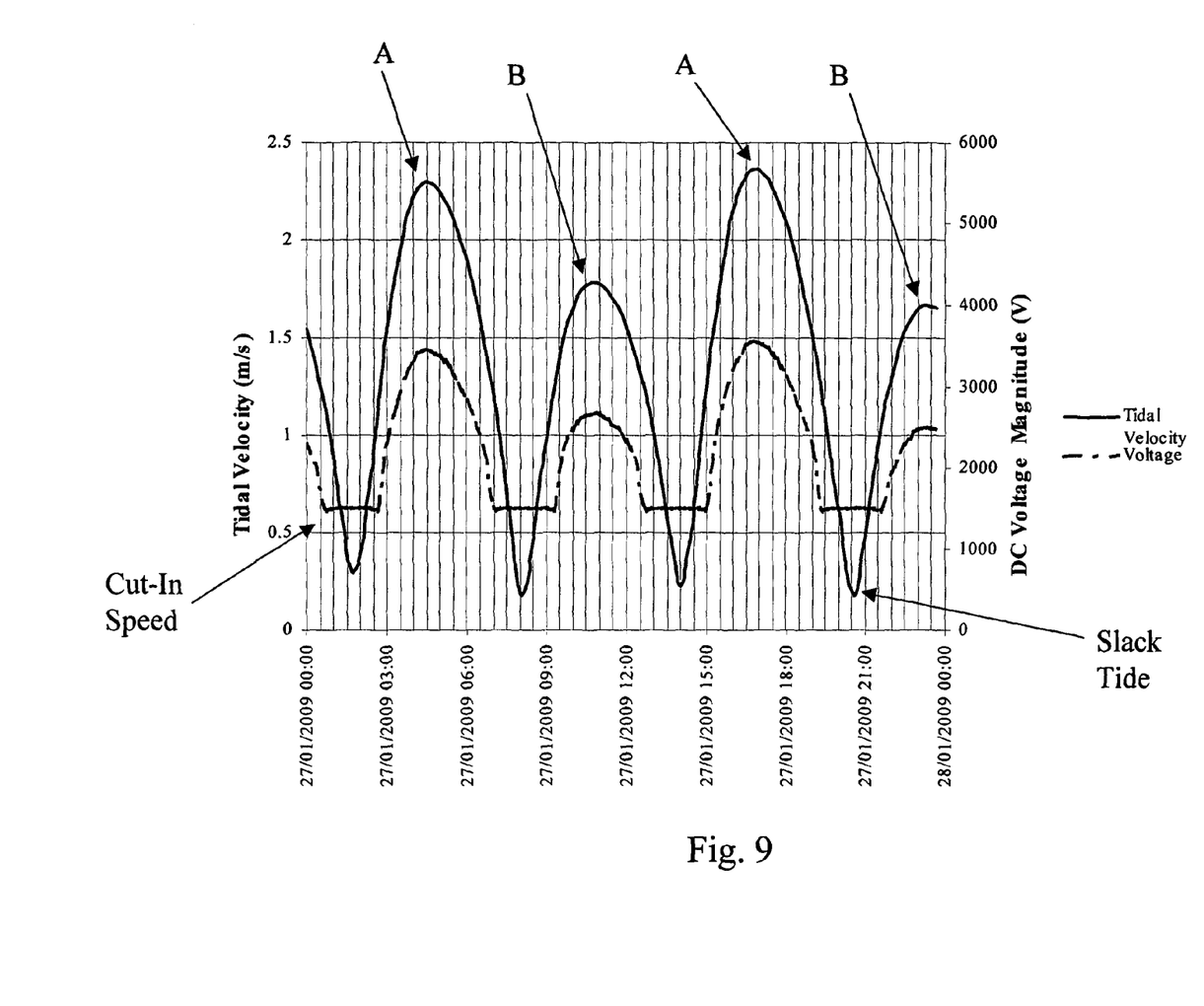
FIG. 9 is a graph showing the line voltage applied to a submarine power cable coupled to an off-shore tidal turbine generator for sample tidal flow conditions, for a semidiurnal tide, over a 24-hour period, according to an embodiment of the invention.

With reference to FIG. 9, a graph is shown of the line voltage applied to a submarine power cable coupled to an off-shore tidal turbine generator for sample tidal flow conditions, for a semidiurnal tide, over a 24-hour period. It can be seen from the graph that, as the tidal velocity (i.e. the level of tidal power) varies between the peak flood tides (marked 'A') and the peak ebb tides (marked 'B'), the voltage applied to the submarine power cable is varied accordingly. However, once the tidal velocity falls below approximately 0.7 m/s (i.e. the cut-in speed of the particular turbine), the cable line voltage is maintained at approximately 1500V. Once the tidal velocity recovers above the cut-in speed, the line voltage is varied accordingly again, and power generation can resume.

It will be understood that the particular fixed voltage applied to the submarine power cable will depend on the design of turbine generator used. Preferably, the cut-in speed is approximately 30% of the peak voltage. For example, for a 500V machine the voltage corresponding to the cut-in speed is approximately 150V, while for a 3300V machine the voltage level corresponding to the cut-in speed will be approximately 990V.

It will also be understood that the enhanced method may be applied in the situation where an array of turbine generators are controlled using a single submarine power cable. In such a case, the cut-in speed will correspond to that level of tidal power below which the power extracted from the array reaches 0 W.

The use of the enhanced control method allows for a more reliable method of operating a single turbine generator or an array of turbine generators, by always maintaining a voltage on the submarine power cable to increase the cables lifetime, and to provide a means of detecting a faulty or damaged cable quickly.

The invention is not limited to the embodiments described herein but can be amended or modified without departing from the scope of the present invention.

The invention claimed is:

1. A method for remotely-controlling an output power generated by at least one off-shore tidal hydroelectric turbine generator from a remote substation using at least one submarine power cable transmitting power from said at least one turbine generator to said remote substation, the method comprising varying a line voltage of the submarine power cable to control a rotational speed of the at least one turbine generator, the rotational speed of the turbine generator being related to the output power generated by the at least one turbine generator, characterised in that the method comprises maintaining a minimum line voltage level on the submarine power cable when the output power generated by the at least one turbine generator drops below a defined output power level.

2. The method of claim 1, wherein the varying of the line voltage is in proportion to a tidal power available at the turbine generator, and further characterised in that the method further comprises maintaining a minimum line voltage level on the submarine power cable when the tidal power available at the turbine generator drops below a cut-in speed of the turbine generator.

3. The method of claim 1, wherein the line voltage is varied between a first value corresponding to a first value below which no output power is generated by the at least one turbine generator, and a second value at which level maximum power is generated by the at least one turbine generator.

4. The method of claim 1, wherein the minimum line voltage level is between 25%-35% of a peak voltage of the turbine generator.

5. The method of claim 1, wherein the method comprises the steps of:
(i) monitoring a signal representative of a tidal power available at the at least one off-shore tidal hydroelectric turbine generator and received at said remote substation through said submarine power cable;

(ii) adjusting the line voltage on said submarine power cable from said remote substation, wherein the line voltage is reduced when the tidal power available decreases and the line voltage is increased when the tidal power available increases; and (iii) repeating steps (i)-(ii) such that the line voltage level of the submarine power cable is varied in proportion to the tidal power available, characterised in that the method further comprises the steps of:

(iv) maintaining a minimum line voltage level on the submarine power cable whenever the tidal power available at the at least one off-shore tidal hydroelectric turbine generator drops below a cut-in speed of the hydroelectric turbine generator.

6. The method of claim 5, further comprising the step of: while maintaining the minimum line voltage level on the submarine power cable, monitoring a state of a circuit formed by the submarine power cable to determine the presence of faults in the cable.

7. The method of claim 1 for remotely-controlling an output power of an array of off-shore tidal hydroelectric turbine generators from the remote substation using the submarine power cable transmitting power from said array to said remote substation, the method comprising varying the line voltage of the submarine power cable to control the rotational speed of the turbine generators in the array, the rotational speed of the turbine generators in the array being related to the output power of the array of turbine generators, characterised in that the method comprises maintaining a minimum line voltage level on the submarine power cable when the output power generated by the array of off-shore tidal hydroelectric turbine generators drops below a defined output power level.

8. The method of claim 1, wherein the step of varying the line voltage of the submarine power cable to control the rotational speed of the turbine generator is based on a predicted tidal power available at the turbine generator.

* * * * *